March 18, 1958

A. G. BODINE, JR 2,827,033

ACOUSTIC WAVE CONTROLLING MEANS FOR SUPPRESSING
DETONATION IN INTERNAL COMBUSTION ENGINES

Filed Sept. 30, 1954

INVENTOR.
Albert G. Bodine Jr.
BY
ATTORNEY

March 18, 1958  A. G. BODINE, JR  2,827,033
ACOUSTIC WAVE CONTROLLING MEANS FOR SUPPRESSING
DETONATION IN INTERNAL COMBUSTION ENGINES
Filed Sept. 30, 1954  9 Sheets-Sheet 9

INVENTOR.
Albert G. Bodine Jr.
BY
ATTORNEY

United States Patent Office 2,827,033
Patented Mar. 18, 1958

2,827,033

ACOUSTIC WAVE CONTROLLING MEANS FOR SUPPRESSING DETONATION IN INTERNAL COMBUSTION ENGINES

Albert G. Bodine, Jr., Van Nuys, Calif.

Application September 30, 1954, Serial No. 459,321

27 Claims. (Cl. 123—191)

This invention relates generally to the control of combustion irregularities, such as detonation or rough burning, in internal combustion engines by acoustic wave suppression.

The present invention deals with improvements in the method and apparatus disclosed in my prior Patent No. 2,573,536. As explained in said patent, I have found that certain combustion irregularities and rough burning in internal combustion engines (hereinafter referred to broadly as "detonation") are intimately related to acoustic wave phenomena known to occur in the combustion chamber. In some engines I have found convincing evidence of a regenerative process connecting detonation with acoustic wave phenomena, a cooperation occurring in which each aids the other to produce a sustained high amplitude acoustic wave which may be regarded as both the effect and the cause of the detonation. In other engines, there is a type of detonation which, I believe, tends to be more a matter of shock excitation caused by sudden combustion, setting up strong acoustic wave vibrations in the gas at the resonant frequency of the combustion chamber. Whatever the cause or the type of detonation, however, I have found it possible to suppress the phenomena by reducing the acoustic wave amplitude.

As further explained in my said patent, the possible powerful acoustic wave modes or patterns within a typical conventional combustion chamber are quite numerous. In other words, there are a large number of specific ways, directions or patterns, as well as a significant range of frequencies, in which the gases can vibrate to set up strong acoustic patterns which contribute seriously to detonation. As for frequency range, I have found that the higher frequencies, corresponding to wave paths which are short relative to cylinder diameter, contribute least to detonation, as they are least easily sustained at high power levels by the combustion process. The higher frequencies are therefore least offensive and of least significance. For adequate control of the numerous possible modes of gas vibration which are significant or strongly contributory to detonation, acoustic techniques are desirably employed which take most, if not all, of such numerous significant modes into account. A very difficult problem is accordingly presented to engine designers, because the acoustic configurations which may be introduced into the chamber to deal with the problem of wave suppression tend to interfere with other mechanical structures, such as valves, spark plugs, water jackets, etc. Thus it is often quite difficult to install acoustic suppression devices and/or configurations in all the locations within the combustion chamber necessary to deal with all of the possible significant gas vibration modes which may tend to occur. This invention is based upon my discovery that the actual modes of the chamber itself can be raised in frequency, reduced in number and controlled in orientation.

The general object of the present invention is accordingly the provision of improved combustion chamber configurations and acoustic wave suppression devices capable of dealing effectively with the gas vibration modes of importance.

A more specific object is the provision of an improved combustion chamber tending to constrain the acoustic gas vibration modes to such as are favorable for suppression by simple and easily introduced wave suppression devices.

A further object of the invention is to simplify the problem of determining the necessary location for gas vibration suppressors by shaping a sufficient proportion of the clearance volume into a wave guide so that a desired reduction in detonation can be easily accomplished simply by locating suitable wave suppression means in closely coupled acoustic relationship to such wave guide.

Speaking broadly of the practice of the invention in one of its primary forms or aspects, I shape the combustion chamber, or a sufficient part thereof for the necessary degree of control, into the form of an acoustic wave guide of such character as will constrain prevalent acoustic gas vibration into a definitely located pattern or mode susceptible of control by simple wave attenuator means. It is a feature that no uncontrollable or unconstrained gas vibration modes of any importance are permitted, particularly those of frequencies resulting from wave paths of dimensions comparable with the larger dimensions of the unmodified chamber. High frequency modes occurring in planes transverse of the wave guide employed are of little if any significance for reasons stated above, and may be disregarded. The "sloshing" mode of a pancake type combustion chamber is a good example of a strong mode (in the frequency range important to detonation) that is difficult to suppress, the problem arising largely from the fact that the direction of vibration is often not constant, and the high impedance regions where absorbers can best be located are prone to shift. One purpose of the present invention accordingly, is to inhibit the occurrence of such sloshing modes.

One preferred practice of the present invention consists in shaping the combustion chamber into a relatively long and slender wave guide, which reduces the possible modes of importance to simple longitudinal modes (longitudinal of such guide) which can be suppressed easily by means of a wave suppressor located, for example, at one or both ends of such guide.

I have found that the entirety of the combustion chamber space need not be shaped into a wave guide; but that a very substantial gain is accomplished if a major portion of the clearance volume during the detonation phase is in the shape of a wave guide. That is to say, a sufficient part of the clearance volume at top dead center should be incorporated in the wave guide to accomplish the control desired or necessary, taking into account such design factors as compression ratio and the octane rating of the intended fuel. The most complete control, of course, is accomplished when the entirety of the clearance volume is within the acoustic wave guide. However, the only concern, apparently, is with the combustion chamber as it exists during the detonation interval. This is the so-called clearance volume near top dead center. In accordance with one preferred form of the invention, I shape the combustion chamber so as to include, as a major part thereof, an acoustic wave guide in the form of a transverse groove or channel placed either in the head of the piston, or the ceiling of the chamber, or both. At the peak of the compression stroke, i. e., at the time of combustion, with the piston near top dead center, most of the combustion gases are crowded into this wave guide groove or channel. Later on in the expansion stroke, the groove forms a lesser proportional part of the total combustion chamber volume, so that engine operation is not modified excepting during that portion of the cycle in which detonation tends to occur in conventional high compression engines.

Viewed in one aspect or form, therefore, the invention consists in constraining those gas oscillations within the frequency range contributory to detonation to take place predominantly in one easily controlled mode, and to attenuate the oscillations occurring in this mode.

In another and broader aspect, a primary underlying purpose in the practice of the basic invention is to achieve a substantial increase in frequency of as many modes as is possible or practicable. This is achieved by forming a substantial portion of the clearance volume into a wave guide or container of relatively small dimensions as compared with cylinder diameter, or into a plurality of such guides or containers, the acoustic phenomena being thus crowded largely into an acoustic environment in which all or most of the dimensions are small. In the case of a diametric groove across the piston, or combustion chamber ceiling, for example, both of the lateral dimensions are small, only the longitudinal dimensions being still relatively as large as many of the dimensions in a combustion chamber not embodying my acoustic invention. In other embodiments to be disclosed, all dimensions are made substantially smaller than many of the dimensions of the unmodified chamber.

The preponderance of small dimensions of a wave guide results, as heretofore mentioned, in most of the wavelengths being very short and consequently of high frequency. As also heretofore mentioned, these high frequencies are not easily sustained at high power levels by the combustion process, which I believe to be due to the fact that the fuel does not easily burn with such speed in cyclic repetition. Moreover, these high frequencies are much more easily attenuated by acoustic attenuation means.

The invention will be further described in connection with the following detailed description of certain present illustrative embodiments thereof, reference for this purpose being had to the accompanying drawings in which.

With reference first to Figs. 1–4, inclusive, I have shown an illustrative embodiment of the invention incorporated in a conventional single cylinder C. F. R. test engine. This engine has a one piece water cooled cylinder barrel 30 provided with cylinder 31 and including integral head portion 32 providing a flat head wall 33 overlying and forming the combustion chamber ceiling over cylinder 31. In the C. F. R. engine, the lower end portion of the barrel 30 is cylindrical and screw threaded as at 34 for mounting in a complementary screw threaded bore in the upper part of the crank case, not shown. The expression cylinder barrel will be used hereinafter and in the claims to denote the wall of the engine cylinder, including the head over the cylinder, whether or not the head is integral with the remainder of the barrel, and whether or not the barrel is a part of a conventional multiple cylinder engine block.

Figure 2:
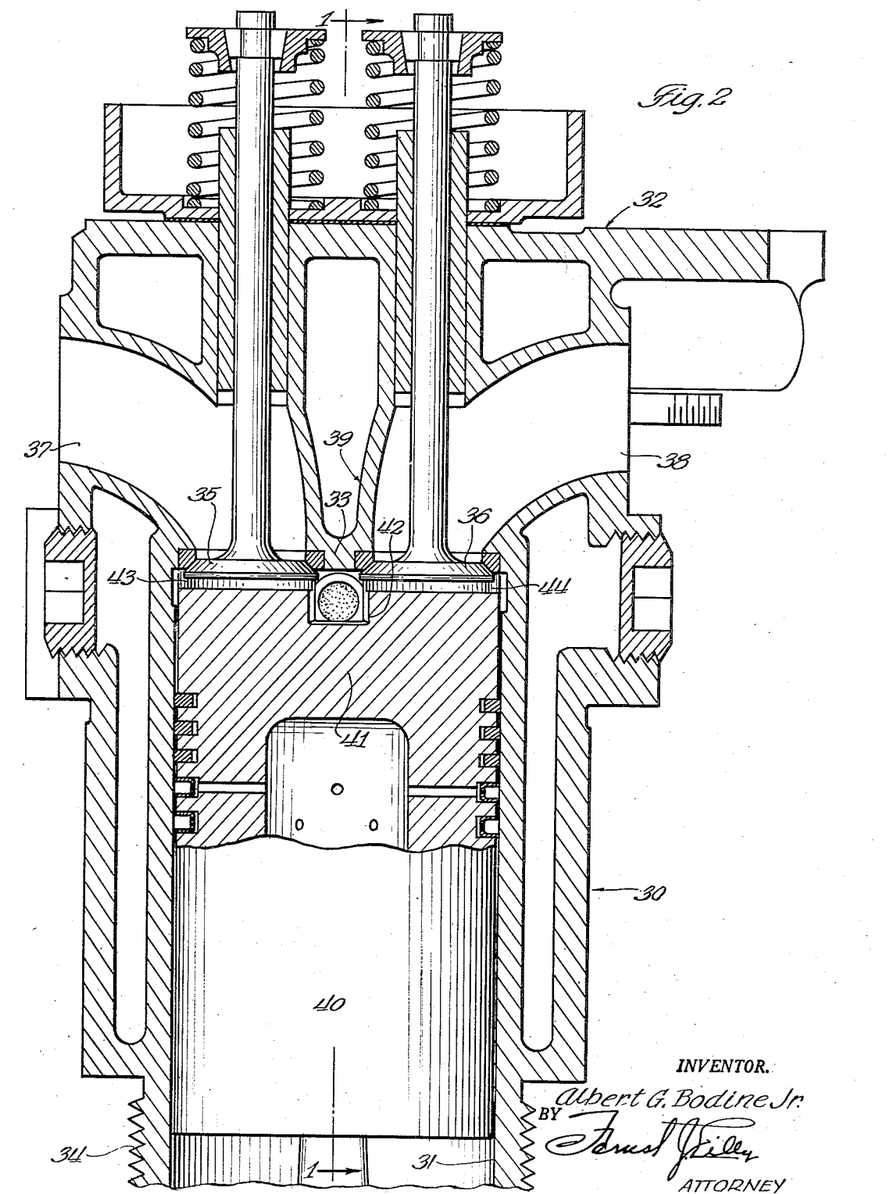
Fig. 2 is a section taken on line 2—2 of Fig. 1.

The illustrative engine is an overhead valve type, and is equipped with intake and exhaust valves 35 and 36 engageable on valve seat rings set into head wall 33, as shown in Fig. 2 so as to control intake and exhaust ports 37 and 38, respectively. A partition wall 39 extending upwardly from head wall 33 separates the intake and exhaust ports, being hollowed out for water circulation, as shown.

Working in cylinder 31 is a piston 40, the upper end of which is formed by a head wall 41 whose upper surface 41a, at top dead center, preferably approaches very closely to the bottom surface of combustion chamber head wall 33. This top or head wall 41 is formed with a diametrically extending groove or channel 42, and is formed also with pockets 43 and 44 on opposite sides of groove 42 for accommodation of the valves 35 and 36. The drawings show the piston at top dead center, and it will be seen that the combustion chamber space or clearance column between combustion chamber head wall 33 and the head wall 41 of the piston consists essentially of the volume of groove 42 in the piston, supplemented to a small extent by clearance space within the valve pockets 43 and 44. In the specific design shown in Figs. 1, 2 and 3, this combustion chamber space is not sufficient for the intended compression ratio, and is accordingly supplemented by additional space provided at the two ends of the groove 42, as later to be described.

Figures 1, 1A:
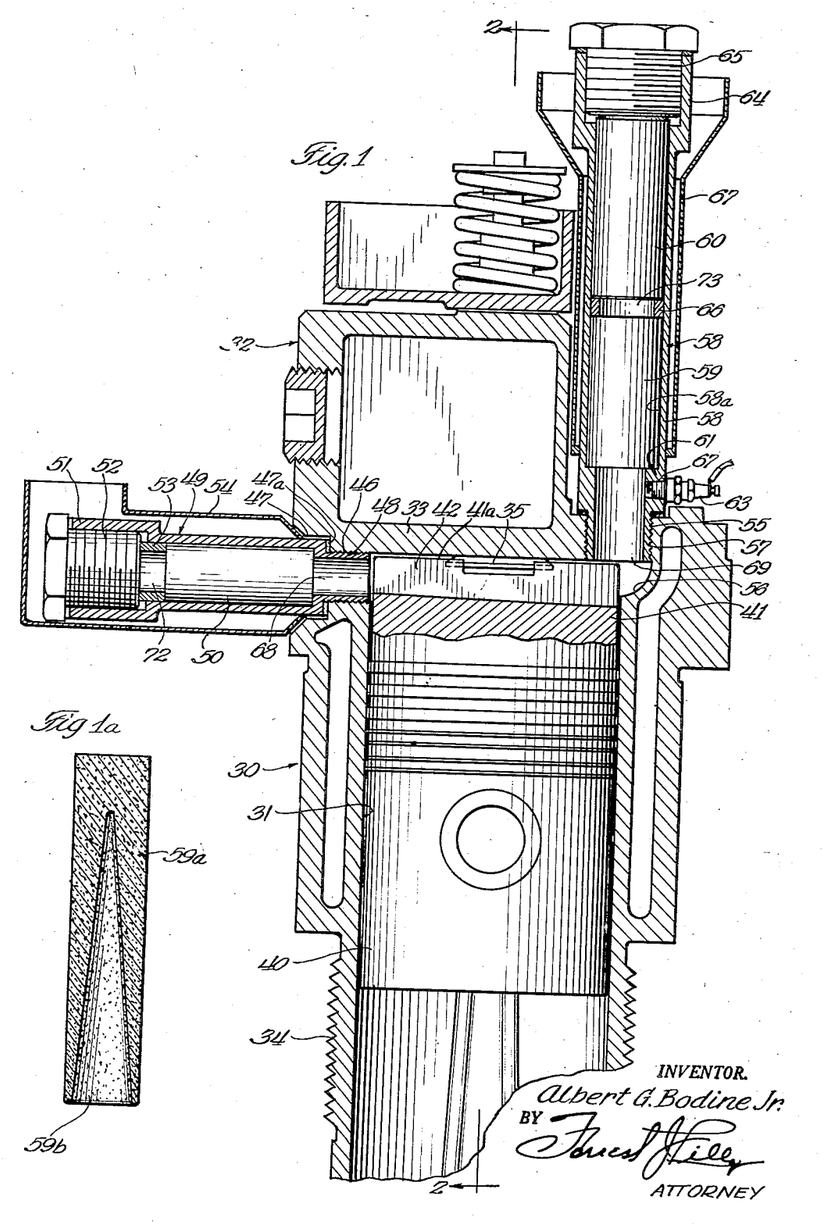
Fig. 1 is a vertical medial section through the cylinder barrel of an internal combustion engine incorporating one embodiment of the engine, the section being taken on line 1—1 of Fig. 2.
Fig. 1a is a detail showing a modified absorber.

The conventional C. F. R. engine has in one side of the block 30, communicating with the top end of bore 31, a horizontal threaded port 46 originally intended for reception of a spark plug, there being a counterbore at 47 forming an annular seat 47a for the usual spark plug gasket. The spark plug has been removed from this port 46 and into the port is screwed a reduced screw threaded stem 48 on the inner end of a tubular casing 49 containing wave suppressor element 50, which in this case is illustratively of the porous absorber type, consisting of a cylindrical body or plug of sintered powdered metal, for example, sintered particles of copper. The absorber body 50 is received within casing 49 and seats against the shoulder formed at the juncture of casing 49 with its reduced stem portion 48. This absorber is compounded according to principles well understood in the acoustic art to have an acoustic attenuative response for the frequency of acoustic waves travelling longitudinally of the wave guide formed by the groove 42. At its rearward or outward end, the casing 49 has an enlarged internally screw threaded portion 51 receiving a threaded closure plug 52, a spacer sleeve 53 being placed between the plug 52 and the adjacent end of the absorber body 50. A coolant jacket 54 is shown to surround casing 49, and is designed to hold a suitable coolant for purpose of cooling the absorber body 50.

The C. F. R. engine also has a vertical threaded port 55 extending downwardly into communication with cylinder 31 at a point diametrically across the cylinder from the aforementioned port 46, the center line of this port approximately coinciding with the side wall surface of the cylinder, and the cylinder wall being relieved as indicated at 56 to form an unobstructed and unrestricted communicating passageway between the upper end of the cylinder and the port 55. In the original unmodified engine, this port 55 was designed to receive a test instrument. For present purposes, there is screwed into the port 55 the reduced screw threaded stem 57 of a second tubular casing, here designated by numeral 58, containing, illustratively, a pair of porous absorber bodies 59 and 60, which may be of the same nature as the absorber body 50 previously described. The bore 58a of the tubular casing 58 terminates somewhat short of the beginning point of the reduced tubular stem 57, so as to provide a suitable wall 61 containing a threaded port 62 to receive a miniature spark plug 63.

The upper end of the tubular casing 58 has an enlarged portion 64 receiving a threaded closure plug 65, and a spacer ring 66 is shown between the two absorber bodies 59 and 60. A coolant jacket 67 surrounds casing 58.

As will be seen from the drawings, the space 68 inside the stem 48 is positioned opposite one end of the piston groove 42, while the space 69 inside the stem 57 of the casing 58 is positioned opposite the other end of the groove 42, in such arrangement as to constitute linear extensions of the elongated space or channel provided by the groove 42. These spaces 68 and 69 add to the total combustion chamber space, which accordingly is made up, in this instance, of the aligned space 68, channel 42, and space 69 (together with the small additional amount contributed by the aforementioned valve receiving pockets 43 and 44). If more space is desired, the absorber body 59 can be eliminated.

The combustion chamber space is thus essentially of relatively long and slender proportions, consisting of an elongated passageway 68, 42, 69. Note will be taken that the groove 42 has been tapered so that its cross sectional area is matched fairly well at both ends to the extension spaces 68 and 69. It is important to recognize in acoustic wave guide design that sudden discontinuities should exist only where reflections are desired. Such passageway 68, 42, 69 affords an acoustic wave guide, constraining the tendency for detonation induced gas oscillations in the combustion chamber to occur in one or more modes which are longitudinal of this wave guide. Tendency for substantial gas oscillation is thus constrained to take place in this channel, which, at top dead center, is the only such space or passageway available for high amplitude gas oscillation to occur. Moreover, because of the easily seen definite slenderness ratio the constraint is oriented to the linear direction longitudinally of the channel, the transverse dimensions of the channel being too small for occurrence of serious modes in any of the transverse planes.

Operation is as follows: Ignition occurring at or near top dead center, the combustible mixture is burned within the combustion chamber consisting essentially of the wave guide channel 68, 42, 69. Any tendency for detonation is, as always, encountered in the general region of top dead center, and upon any tendency for detonation to occur, acoustic waves tend to be set up, as explained earlier herein and in my aforesaid parent patent, at the natural resonant frequency or frequencies of the combustion chamber space, which in this instance consists essentially of the wave guide channel 68, 42, 69. In conventional engine designs, the combustion chamber is of such unplanned configuration as permits many different modes of such resonant gas oscillation to occur, such as sloshing, radial, circumferential, and not only at the fundamental frequency, but at various harmonics. To make matters even worse, these various powerful degrees of freedom will usually cross-couple, giving additional complex frequencies. In the combustion chamber of the invention, consisting of the linear wave guide channel 68, 42, 69, acoustic gas oscillations within the significant frequency range (strongly contributory to detonation) are constrained to follow the only wave path available, which is the path extending longitudinally of the described linear wave guide, as previously stated. Only the mode or modes extending longitudinally of the linear wave guide channel need be considered, for the reason that wave paths transverse of the wave guide are so short as to elevate any frequencies so generated to inoffensive frequency levels.

Assuming for the moment that the ends of the wave guide 68, 42, 69 were to be terminated by fully reflective end walls (instead of by the porous absorbers 50 and 59) a longitudinal mode, at the fundamental resonant frequency of the guide, together with possible harmonics, would tend to develop upon occurrence of detonation. Such modes would be characterized by standing waves extending linearly along the wave guide, with regions of high specific acoustic impedance at the reflective ends of the guide. The overall problem reduces, then, to suppression of the longitudinally directed standing wave system in the wave guide, it being known in advance that high impedance regions of any such system will appear at the ends of the wave guide. Such wave suppression is best accomplished by location of frequency responsive acoustic wave suppressors at the high impedance regions of the standing wave, or in other words, at the ends of the wave guide.

Broadly, the acoustic suppressors may be of various types, but in all cases, they are designed to prevent, or materially reduce, inhibit, or interfere with, the wave reflection that otherwise occurs at the ends of the wave guide, it being understood that the undesired phenomena of standing waves depends upon such reflectivity at the ends of the guide. The suppressors may be said to reduce the high impedance characteristic otherwise prevailing at the ends of the wave guide by substitution of an acoustic element of low acoustic impedance. Low acoustic impedance is to be understood as inconsistent with wave reflection. In other terminology, the suppressors stop wave reflection at the ends of the wave guide by terminating it at its ends with acoustic elements which are effectively or equivalently "infinite lines." In practice, an ideal "infinite line" is difficult of attainment, but wave suppressors in the form of porous absorbers such as the absorbers 50, 59, and 60 of Fig. 1 make a good approach and are highly effective, greatly reducing wave reflection, and correspondingly inhibiting the build up of resonant standing waves. In the attenuation process with use of porous absorbers, the sonic pressure wave is largely transmitted into capillary-like openings in the porous absorber body and its energy dissipated therewithin. In simple language, absorption takes place, instead of reflection, and the offending wave is stunted.

The porous absorber body 50 at the one end of the wave guide, and the bodies 59 and 60 at the other, may be constructed by known techniques to have maximum attenuative response characteristics for the wave frequencies tending to be generated in the wave guide. A porous body is largely frictional, or "resistive," in its effect on an incident sonic wave, but the acoustic impedance presented by the body has also a reactive component. It is found that the reactance of such a device can be adjusted materially by use of a cavity such as 72 located in back of the plug. Reduction of the cross-sectional area of neck 68 can also be used to reduce the frequency of response as a means to reduce impedance.

The attainment of the complete equivalent of an infinite line requires the use of a suppressor presenting to the wave guide an acoustic impedance perfectly matched to the impedance of the wave guide. The attainment of this ideal is, in practice, extremely difficult, although the porous absorber bodies 50, 59 and 60 afford a good approach, sufficient for practical purposes. It is possible to make a considerably closer approach by further special acoustic design of the porous absorber. For example, in Fig. 1a, I have shown a specially shaped porous absorber body 59a designed for installation in the casing 58 of the engine of Fig. 1. This body 59a has a tapered opening 59b extending into it from its forward end, giving its walls a wedge-like cross-sectional variation along its length. Such a device, with a gradually increasing cross section of porous material, has very low wave reflectivity. In other words, the acoustic impedance which it presents to the acoustic wave guide is closely matched to that of the guide, and it appears to the wave as substantially an infinite line.

Figure 5:
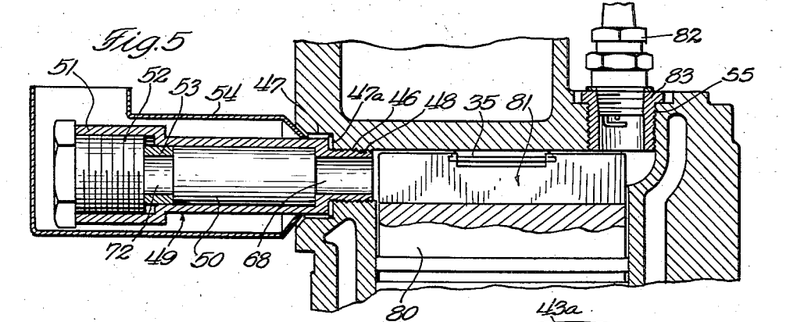
Fig. 5 is a fragmentary view similar to Fig. 1 showing a modification.
Figure 6:
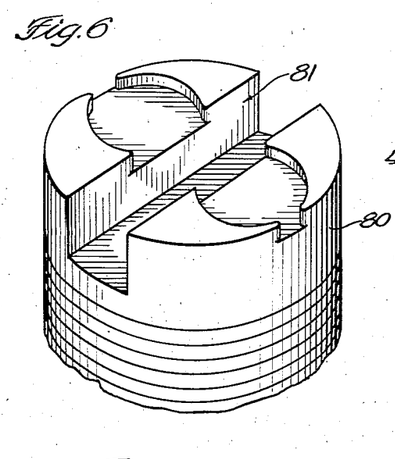
Fig. 6 is a perspective view of the modified piston of Fig. 5.

In Figs. 5 and 6 I have shown a modification of the invention, wherein the piston 80 has a transverse groove or channel 81, similar, in general, to the channel 42 of the piston of the first described embodiment, but of greater cross-sectional area, so as to provide a larger clearance volume, avoiding the necessity for substantially supplementing this clearance volume as was done in the first described embodiment (see Fig. 1). The cylinder barrel may be the same as in Figs. 1 and 2, and similar reference numerals are accordingly used, the only difference being that the spark plug 82 is placed in the port 55, using an adapter 83. The casing 49 screwed into port 46 contains an absorber 50 understood to be like that of Fig. 1. The wave guide thus in this case consists almost entirely of the piston groove 81. Also, a porous absorber is located at only one end of the wave guide. It is of course of additional acoustic advantage to employ absorbers at both ends of the wave guide. However, the acoustic wave in the guide 81 may be very materially attenuated by employing an absorber at one end only, and the installation is simplified by having the clearance volume confined entirely to the wave guide space 81 within the piston.

Figure 7:
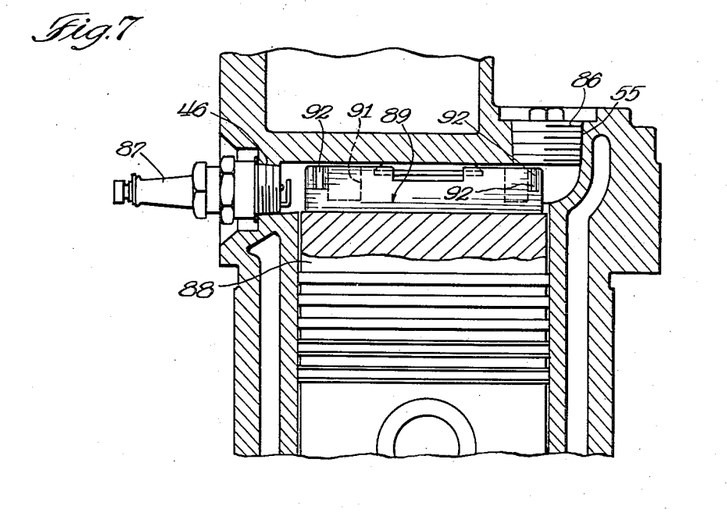
Fig. 7 is a fragmentary view similar to Fig. 1 showing another modification.
Figure 8:
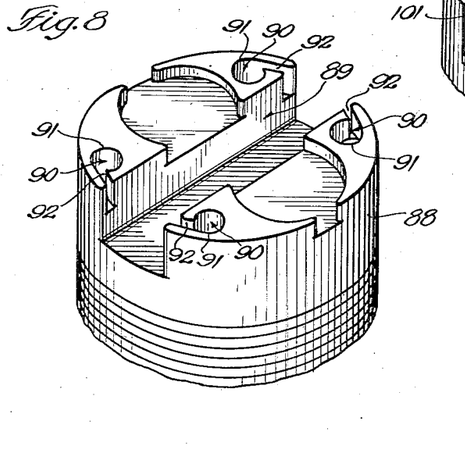
Fig. 8 is a perspective view of the piston of Fig. 7.

Figs. 7 and 8 show another modification of the same engine, wherein the port 55 is closed by a plug 86, and a spark plug 87 is installed in the port 46. The piston 88 in this case has a wave guide channel 89, constituting substantially the entirety of the clearance volume, and in this case, the wave suppressor means are placed in the head of the piston, in communication with the ends of the wave guide channel 89. As shown, the wave suppressor means are in the nature of resonant absorbers 90, consisting of cavities 91 formed in the top of the piston and communicating via narrow necks 92 with the end portions of the wave guide, there being two of such absorbers at each end of the wave guide communicating with opposite sides thereof. It will be seen that these resonant absorbers are in the nature of Helmholtz resonators, and the size of the cavities 91 is made such as to be tuned to or resonant to the frequencies of the acoustic standing wave tending to be set up in the wave guide 89. Such resonant absorbers provide regions of low acoustic impedance at the end portions of the wave guide, functioning in accordance with well understood laws of acoustics to inhibit the build up of the longitudinal standing waves which might otherwise be excited in the wave guide 89.

Figure 9:
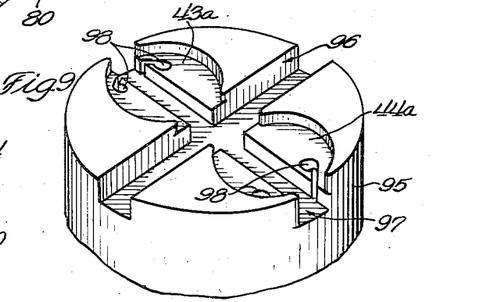
Fig. 9 is a perspective view of another modified piston.

In Fig. 9 is shown a modified piston 95, designed for use in the engine shown in Figs. 1 and 2, having one diametric wave guide groove or channel 96, comparable with the groove 42 of the piston of Fig. 1, and having a second wave guide channel or groove 97 formed at right angles to the wave guide 96. The wave guide 96 will be understood to be aligned with the porous absorbers 50, 59 and 60 of Fig. 1, and waves tending to be set up in the guide 96 are accordingly suppressed by the porous absorbers 50, 59 and 60. The wave guide channel 97, which will be seen to intersect the valve pockets 43a and 44a, has at its ends resonant absorbers 98 of the same character as the absorbers 90 of Fig. 8. Thus, in this case, the total clearance volume is added to by the second wave guide 97, and modes of vibration are permitted longitudinally of each of the two intersecting wave guides. The mode tending to be set up in the channel 96 is suppressed by porous absorbers, in the manner of Figs. 1 to 4, whereas the mode tending to be set up in the channel 97 is suppressed by the resonant absorbers 98, in accordance with the principles described in connection with Fig. 8.

Figure 10:
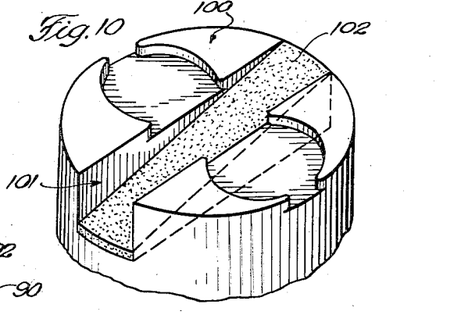
Fig. 10 is a perspective view of another modified piston.

In Fig. 10 is shown another modified piston, here designated by numeral 100, designed for use in the engine of Fig. 7 as an alternative for the piston shown therein. In this case, the piston is formed with a diametric wave guide groove 101, and mounted in this groove is a wedge-shaped porous absorber 102. In this case, the wave guide comprising the groove 101, and the attenuator comprising the wedge-shaped absorber 102, are in effect combined in a single structure. Waves traveling lengthwise of the guide are subjected to continuous and progressive acoustic attrition, especially in the direction of increasing absorber thickness. The absorber in this form has a certain degree of the aforementioned infinite line characteristic spoken of in connection with Fig. 1a, in that the absorber itself does not create substantial wave reflection, but rather progressively absorbs the wave. The wave is caused by the gradually thickening absorber to make a substantial gradual penetration into the absorber. To be effective, the absorber must be acoustically fairly transparent, which property can be determined conveniently by sending controlled waves to the absorber from a loudspeaker and measuring the portion of the wave reflected back by use of conventional equipment. Determination can also be made by knock testing in an engine.

Figure 11:
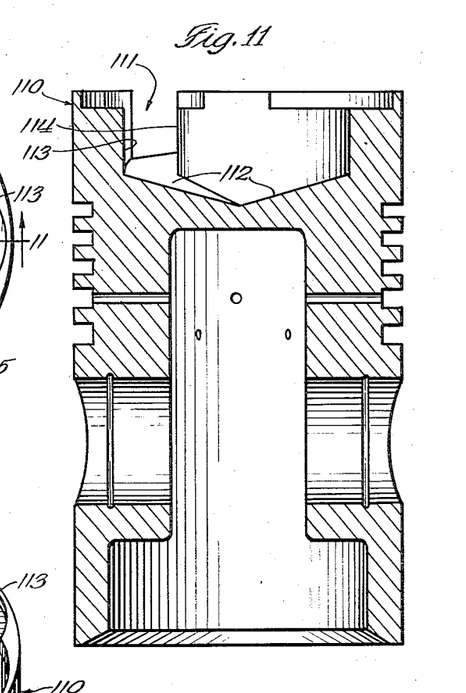
Fig. 11 is a vertical longitudinal section of a modified piston for an engine such as shown in Figs. 1 and 2.
Figure 12:
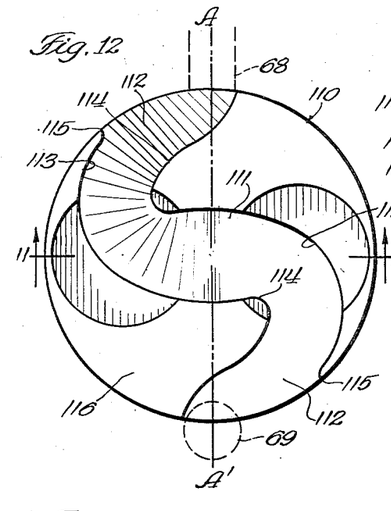
Fig. 12 is a plan view thereof.
Figure 13:
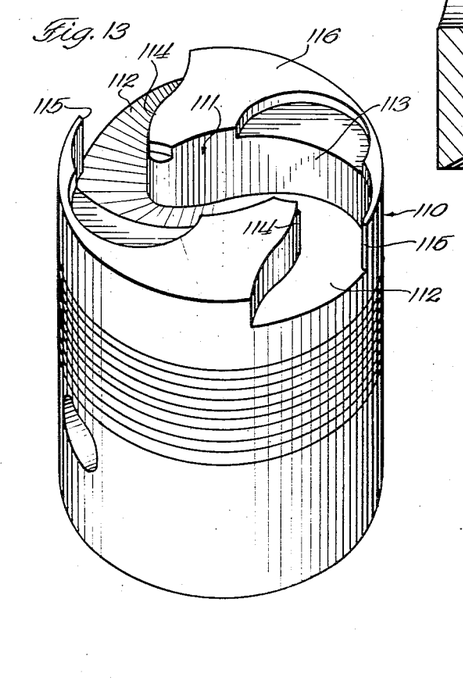
Fig. 13 is a perspective view of the piston of Figs. 11 and 12.

Figs. 11, 12 and 13 show another modified form of piston, designed for use in the engine of Figs. 1 and 2, in combination with the porous absorbers of said engine. The piston 110 in this case has a sinuous or S-shaped wave guide groove 111, the two ends of which are diametrically opposite, as seen best in Fig. 12. The piston is placed in the engine of Fig. 1 with its diametric axis A—A' aligned with the longitudinal axis of the absorber 50 so that the two ends of the wave guide communicate with the passage 68 leading to absorber 50 and with the passage 69 leading to the absorbers 59 and 60 (the passages 68 and 69 being indicated in dash lines in Fig. 12). The cross section of the wave guide 111 is preferably made of maximum area at its longitudinal center, i. e., at the plane through the axis A—A', the passage converging toward each end substantially as an exponential horn. This is accomplished partly by employing floor surfaces 112 in the groove slanting upwardly from its longitudinal center towards each end, and partly by employing side wall surfaces 113 and 114 which converge towards the ends of the guide. It may be noted that the side wall surfaces 113 run out of the piston at 115, but it will be understood that the adjoining curved wall surface of the cylinder bore continue the guide from the points 115 to the passages 68 and 69, and that such curved cylinder wall surfaces maintain the exponential convergence of the guide to the points of communication with the respective passages 68 and 69.

Figure 3:
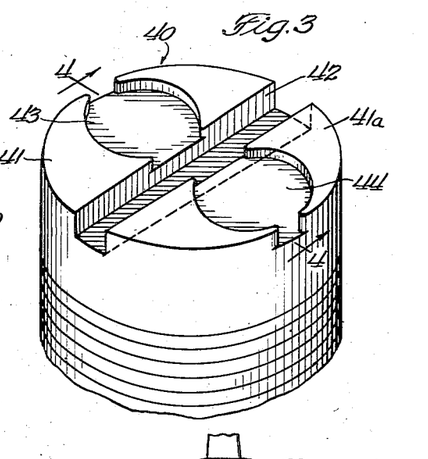
Fig. 3 is a perspective view of the piston of the engine of Figs. 1 and 2.
Figure 4:
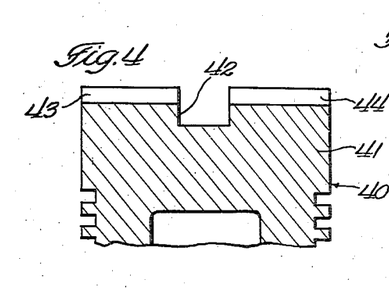
Fig. 4 is a vertical medial section of the piston taken as indicated by the arrows 4—4 of Fig. 3.

The piston of Figs. 11 to 13, assumed to be installed in the engine of Figs. 1 and 3, employing the porous absorbers 50, 59 and 60, operates generally in accordance with the description given earlier of the same engine using the piston form shown specifically in Fig. 3. The piston of Figs. 11–13 has the advantage of affording a somewhat larger and substantially longer wave guide. In addition, it has the specific advantage that any gas oscillation tending to be set up transversely of the piston between the top of the piston and the combustion chamber head wall 33 must cross some portion of the sinuous wave guide 111 no matter what the direction of oscillation may be. This is of especial advantage in the event that some material clearance space should be permitted between the top surface 116 of the piston at top dead center and the combustion chamber head wall 33, as may sometimes be desirable. I have found that gas oscillations tending to be set up in such clearance space, i. e., adjacent the head wall 33, and consisting of radial, sloshing, or circumferential modes, couple into the wave guide 111 and result in vibration modes which are longitudinal of this wave guide, and are controlled by the acoustic suppressors installed at the ends of said guide.

The wave guide 111 has the further novel feature that it not only is provided with acoustic absorbers at its two ends, which are understood to suppress standing waves by reducing reflectivity at the ends of the guide, but also that it forms, in effect, two exponential horns disposed mouth to mouth, each functioning in the manner peculiar of exponential horns to suppress back reflections from its throat. The wave guide form of Figs. 11–13 thus is doubly effective in suppressing standing waves tending to be set up within it. It also, as explained above, is effective in that it couples in an extraordinary manner to vibration modes tending to be set up in any direction between the top surface of the piston and the head wall of the combustion chamber, establishing a means by which the acoustic suppressors at the two ends of the wave guide gain control over such modes regardless of their orientation.

Figure 14:
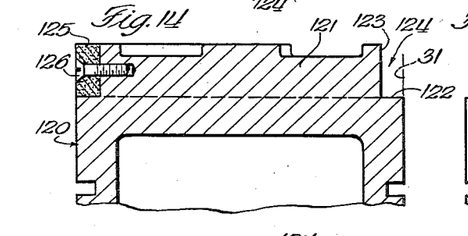
Fig. 14 is a longitudinal sectional view, taken on line 14—14 of Fig. 15, showing the upper end portion of another modified form of piston adapted for use of an engine such as that of Fig. 7.
Figure 15:
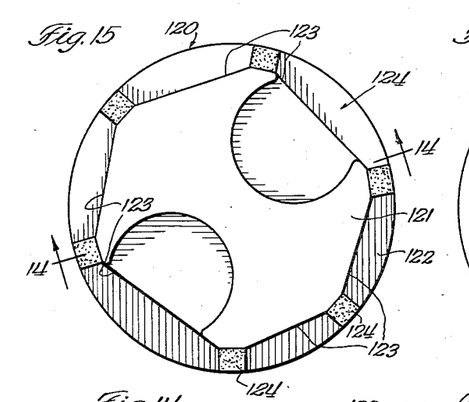
Fig. 15 is a plan view of the piston of Fig. 14.

Figs. 14 and 15 show a further modified type of wave guide piston, useful in a flat pancake type of combustion chamber such as afforded by the C. F. R. type of engine shown in Figs. 1 and 2, and again in Fig. 7. Preferably, the engine is in this case used in the condition illustrated in Fig. 7, where the spark plug is placed in the port 46, and the port 55 is plugged. With such understanding, the piston, designated generally by numeral 120, is formed at its top end with a reduced or cut back portion 121, affording a circumferential upwardly facing shoulder 122, and, in the specific design of Figs. 14 and 15, a reduced upper end periphery consisting of a plurality of sides 123 of unequal length, so as to form, with the opposite surface of the cylinder bore 31, a circumferential or circumscribing wave guide 124. This wave guide is interrupted by a plurality of spaced acoustic suppressors 125, here shown in the form of blocks of acoustic absorbent material, located between the sides or faces 123, and fastened in place in any suitable manner, typified by screws 126 (Fig. 14). Thus the suppressors are unequally spaced about the wave guide 124. The clearance volume in this case comprises the wave guide space 124 extending circumferentially about the top end of the piston, between the portion 121 and the opposed surface of the cylinder wall, together with any desired or permissible additional clearance volume between the top end of the piston and the combustion chamber head wall, which, however, is preferably minimized. Acoustic waves are thus primarily constrained to occur in a direction circumferentially of this wave guide. If there is any tendency for sloshing or other modes above the top end of the piston, such incipient modes couple into the wave guide 124. Symmetric standing wave patterns can not easily occur in circumferential wave guide 124, because of the unequally spaced absorbers 125. The operation is thus analogous to that of the diametric wave guides, in that gas oscillations tending to be set up by combustion are constrained to occur in and to take the direction of the wave guide, or to couple into the wave guide, and are prevented from building up into significant standing wave patterns by use of the acoustic absorbers. In the present instance, the location of natural high impedance regions of the wave guide is not readily predicted in advance, as in the case of the diametric wave guides. However, placement of the absorbers at unequal spacings has the effect of preventing symmetrical wave patterns such as would naturally tend to occur in the guide, and hence standing wave action is inhibited.

Figure 16:
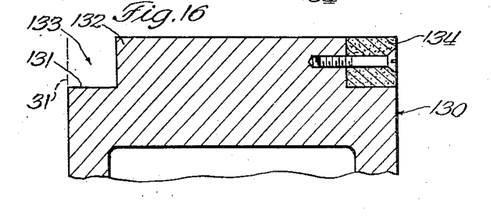
Fig. 16 shows a modification of the piston of Fig. 14.
Figure 17:
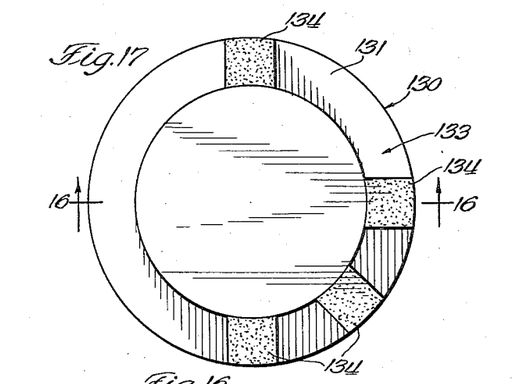
Fig. 17 is a plan view of the piston of Fig. 16.

Figs. 16 and 17 show a modification of the piston of Figs. 14 and 15, the upper end portion of the piston 130 in this case being formed with an annular reduction, so as to afford an annular upwardly facing shoulder 131, and a reduced annular portion 132. Thus there is again provided, between the upper end portion of the piston and the adjacent cylinder wall, a circumferential wave guide, here indicated by numeral 133. Acoustic absorbers are again installed in selected positions within this wave guide, as indicated at 134, being again illustratively shown as absorbers of the porous type. In this case, however, two of the absorbers are placed at 180° spacing, a third is placed at 90° from the first two, while still a fourth is placed between two of the 90° spaced absorbers. By use of such spacing, standing waves tending to be set up in the wave guide, are effectively inhibited. The two 180° spaced absorbers are effective to inhibit the fundamental or lowest frequency mode, while the remaining absorbers are suppressive of higher modes. By this spacing, the lower and most important modes are in an environment such that if the mode geometry were to shift its position so as to be least affected by one absorber spacing, it would encounter an intervening absorber.

Figure 18:
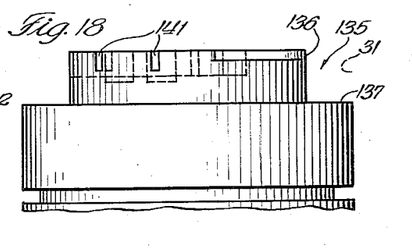
Fig. 18 is an elevational view showing another modified form of piston adapted for use in such an engine as that shown in Fig. 7.
Figure 19:
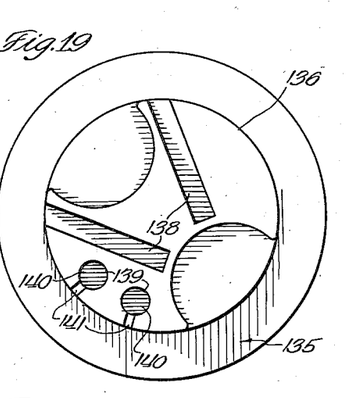
Fig. 19 is a plan view of the piston of Fig. 18.

Figs. 18 and 19 show another modified piston of the type providing a circumferential wave guide space, here designated at 135, between a reduced upper end portion 136 of the piston and an upwardly facing annular shoulder 137, in combination with the adjacent wall of the cylinder. In this case, I have incorporated, in the reduced portion 136 of the piston, pairs of resonant absorbers spaced along the wave guide a distance approximately equal to one-fourth of the wavelength corresponding to the resonant frequency of the members of each such pair, the resonant frequencies of the different pairs of absorbers being selected to inhibit the first few frequencies of standing waves tending to be set up in the wave guide space 135. One illustrative pair of such resonant absorbers comprises open sided grooves 138 sunk into the upper face of the piston portion 136, and functioning as one-quarter wavelength resonant absorbers or spoilers. Another illustrative pair comprises Helmholtz type absorbers 139, consisting of cavities 140 and necks 141, the cavities and necks both opening through the top of the piston portion 136, and the necks 141 also opening to the wave guide space 135, as shown. These resonant absorbers, as is well understood by those versed in the art of acoustics, are strongly attenuative of wave frequencies to which they are resonant. Accordingly, by determining in advance the prevalent wave frequencies tending to occur within the wave guide space 135, the absorbers such as 138 and 139 can be effectively dimensioned to be resonant to such frequencies and hence absorptive of the acoustic standing wave tending to be established. By locating the members of each pair at quarter-wave spacing, along the guide, there is assurance either that one absorber will be close to a high impedance region of the standing wave tending to be set up and thus effective to attenuate the wave, or both will be sufficiently close to a high impedance region to cooperate in attenuating the wave.

Figure 20:
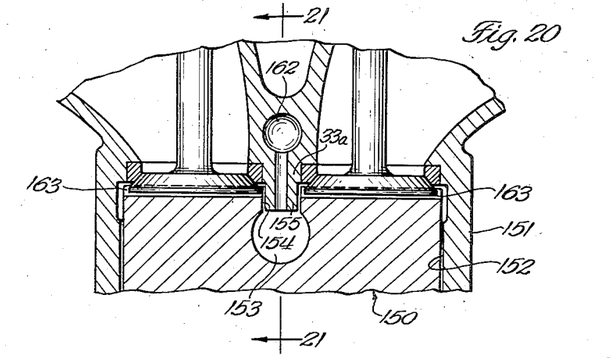
Fig. 20 is a vertical medial section through a modified engine in accordance with the invention.
Figure 21:
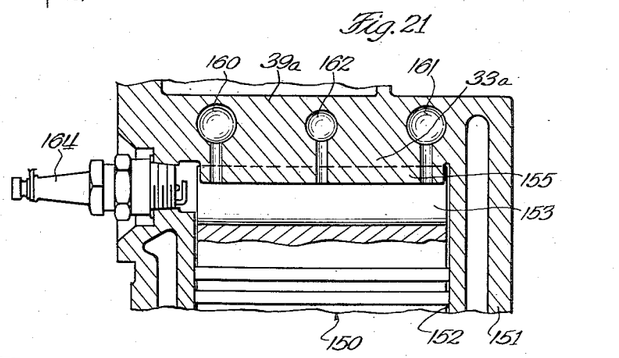
Fig. 21 is a section taken on line 21—21 of Fig. 20.
Figure 22:
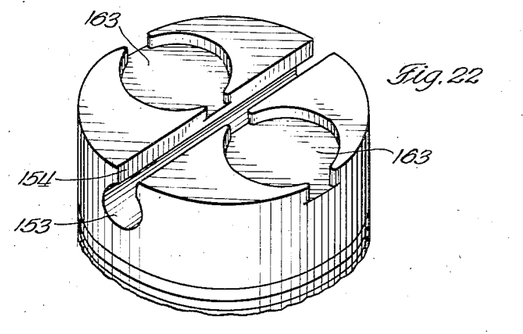
Fig. 22 is a perspective view of the piston of the engine of Figs. 20 and 21.

Figs. 20 to 22 show a modified form of engine and piston, the piston being designated at 150, and the block at 151, the latter having cylinder bore 152. The engine may again be understood to be of the C. F. R. type, represented more fully in Figs. 1 and 2, but with modifications to be described. Piston 150 is formed with a sound wave guide channel 153 extending diametrically thereacross, but this sound wave guide channel is somewhat lower in the piston than in the earlier described embodiments, and has a restricted neck portion 154 at the top which, at top dead center, is filled by a projection 155 extending downwardly from the head wall 33a of the combustion chamber. The partition wall 39a extending upwardly from head wall 33a between the intake and exhaust ports is availed of for purpose of locating therein resonant absorbers, illustratively of the Helmholtz resonator type. As shown, two such resonant absorbers 160 and 161 communicate with the wave guide channel 153 at opposite ends of the latter, and these are designed to be resonant to the fundamental resonant wave pattern tending to be set up in the wave guide 153. A third such absorber 162, of smaller size, understood to be tuned to a harmonic tending to occur in the wave guide 153, communicates with the longitudinal center of the wave guide. Spark plug 164 is located at the end of the channel 153.

Thus in this form of the invention, practically the entire clearance volume, excepting for the small pockets 163 for accommodation of the valves, is enclosed within the piston and consists of the wave guide channel 153. Suppression of the acoustic standing wave tending to be set up in this channel 153 takes place by action of the resonant absorbers, described above. The novel feature of the embodiment of Figs. 20–22 is that the wave guide channel 153 remains substantially closed for a predetermined crank angle following beginning of combustion, and this crank angle is made such as to include the critical period during which detonation may occur.

Figure 23:
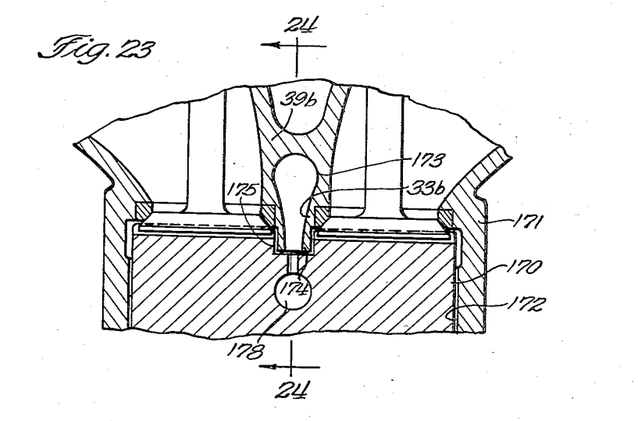
Fig. 23 is a vertical medial fragmentary section of another engine in accordance with the invention.
Figure 24:
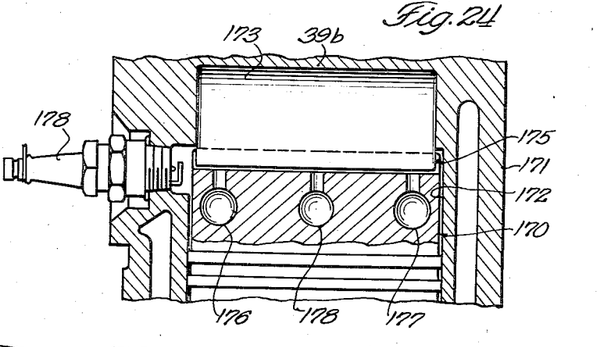
Fig. 24 is a section taken on line 24—24 of Fig. 23.
Figure 25:
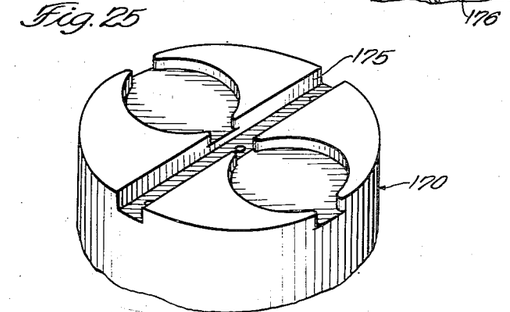
Fig. 25 is a perspective view of the piston of the engine of Figs. 23 and 24.

Another modification is shown in Figs. 23 to 25, and consists essentially of the reverse arrangement as compared with the embodiment of Figs. 20–22. Here, the piston is designated at 170 and the block at 171, the block having cylinder bore 172. The engine is again to be understood to be of the C. F. R. type, modified as follows. A sound wave guide channel 173 is formed in head wall 39b, one side of this channel opening downwardly through a downward projection 174 from head wall 39b into the bottom of a diametric groove 175 formed in the top of the piston, the downward projection 174 substantially filling this groove 175, as shown. Resonant acoustic suppressors, illustratively of the Helmholtz type, are provided in the head of the piston, and are arranged to communicate with the wave guide 173, as shown. Thus there are two of such resonant suppressors 176 and 177 communicating with opposite ends of the wave guide 173, and a third suppressor 178 communicating with the center of the wave guide, as shown in Fig. 24. A spark plug 179 is positioned adjacent one end of channel 173, as shown in Fig. 24. The tuning and operation of the resonant absorbers will be understood from what has gone before, it being simply noted at this point that said suppressors are tuned to fundamental and harmonic resonant frequencies tending to occur inside the channel 173 in the longitudinal direction thereof.

Thus, in the engine of Figs. 23–25, the combustion chamber space, for the first few degrees of crank angle following initiation of combustion, sufficient to cover the detonation period, consists mainly of an enclosed wave guide channel formed primarily within the head wall structure 33b, 39b. At a crank angle safely beyond the detonation period, the piston separates from the head wall projection 174, opening up the combustion chamber to include the clearance volume between the entire piston and overlying head wall.

Figs. 26 and 27, and Figs. 28 and 29 show two further forms of the invention characterized in that all of the dimensions of the wave guide, cavity or container are made small relative to the diameter of the piston, so that all wave modes will be of elevated frequencies, and hence less offensive in their contribution to detonation, as well as easier to attenuate.

Figure 26:
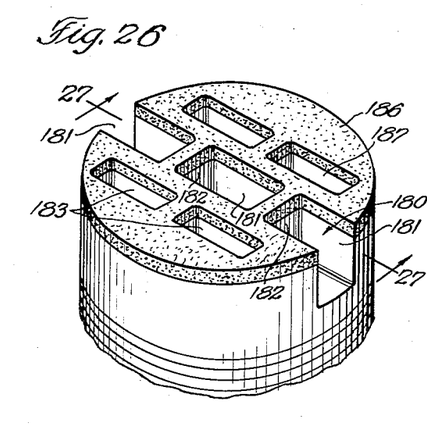
Fig. 26 is a perspective view of another piston in accordance with the invention for use with a typical automotive engine such as that of Fig. 7.
Figure 27:
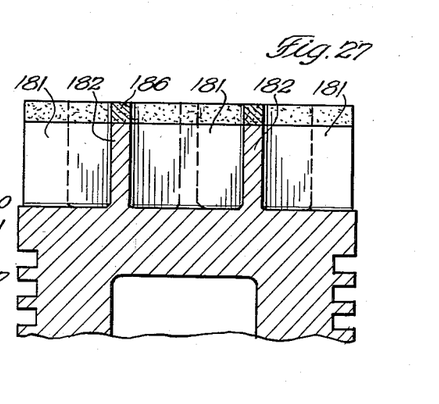
Fig. 27 is a section taken on line 27—27 of Fig. 26.

The piston shown in Fig. 26 is adapted for use in the engine shown, for example, in Figs. 1 and 2, or that of Fig. 7, it being understood that the piston, at top dead center, will make a close approach to, preferably almost contacting, the combustion chamber head wall. In this modification, a diametrically extending wave guide channel means, generally designated by numeral 180, is formed in the top of the piston, and provides combustion chamber space, as before. The wave guide channel means 180 is in this case, however, segmented or subdivided into a series of short channels 181, here three in number, by intervening partitions 182. It will further be understood that the piston will be arranged in the engine to approach relatively close to the head wall of the combustion chamber at top dead center, so that substantially all, or at least a preponderant portion, of the combustion chamber clearance volume will be provided within the channel means of the piston, the head wall forming a high impedance "lid" over the several channels or pockets 183. If desired, additional series of such short channels may be provided on opposite sides of the diametric channel means 180, as indicated at 183. These shorter wave guide channels are of advantage in that their natural resonant frequency for longitudinal modes is substantially higher than in earlier described embodiments, and, as stated before, the higher frequency wave patterns are not only less prone to contribute to detonation, but are most easily attenuated.

The attenuation means may be of various forms. For example, the porous absorbers of the engine of Figs. 1 and 2 are properly positioned for attenuation of the gas oscillation pattern tending to be set up in the two outside wave guide channels 181, assuming, of course, that the series of such channels is alined with the absorbers of Figs. 1 and 2. The central channel 181, and the channels 183, may if desired be provided near their ends with resonant absorbers of the type shown in Fig. 8. Preferably, however, and as shown in Fig. 26, the attenuator means comprises a disk 186 of porous absorber material, e. g., sintered powdered metal, such as bronze, secured to the top of the piston, and provided with suitable apertures 187 over the several wave guide channels. Such absorber means, whose porosity has been determined to have an attenuative acoustic frequency response for the wave patterns, is generally effective to attenuate any wave patterns tending to be established, over the piston, and, having portions thereof located immediately adjacent both ends of each wave guide channel, is effective in attenuating any longitudinal wave patterns tending to build up in those channels.

Figures 28, 29:
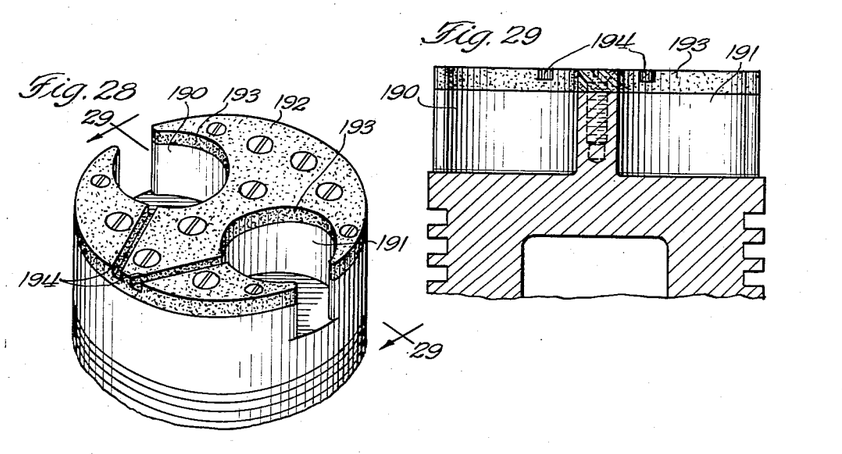
Fig. 28 is a perspective view of another modified piston in accordance with the invention for use with an engine such as that of Fig. 7.
Fig. 29 is a view taken on line 29—29 of Fig. 28.

Figs. 28 and 29 show a case in which the piston (to be understood as used typically in an engine barrel such as shown in Fig. 7) is formed in its top with two generally cylindric upwardly opening pockets 190 and 191, positioned so as to accommodate the two valves in the head (see Fig. 2). These pockets, here illustratively shown as generally cylindric in form, though they may be conic, or of other suitable configuration, form wave containers which preferably provide substantially all, and at least a preponderant portion, of the combustion chamber clearance volume at top dead center, it being understood that the piston will approach relatively close to or almost contact the preferably flat head wall of the combustion chamber at top dead center. As in the case of previously described embodiments, the wave attenuation means is shown as in the form of a disk 192 of porous absorber material, for example, sintered powdered metal, secured to the top of the piston, having the necessary frequency response and provided with suitable apertures 193 over the wave containing pockets. Flame path grooves 194 of incidental dimensions in the disk 192 connect the pockets 190 with a spark plug which may be positioned as suggested in Fig. 7. In this case, gas oscillation modes are constrained to occur in the pockets 190, all dimensions of which are sufficiently small to assure frequency elevation of all gas oscillation modes to the level at which acoustic wave phenomenon are no longer of great significance. Such acoustic waves as do occur within the pockets 190, moreover, are readily controlled by suitably placed attenuators, for example, by the porous absorber disk surrounding the tops of the pockets.

Reverting to the embodiments of Figs. 20–22 and 23–25, attention is now directed to the clearance space shown around the plug 155 where it enters the wave guide neck 154 in the first case, and the similar clearance space between the plug 174 and the neck 175 in the second. These clearance spaces form restricted orifices between the respective wave guides and the balance of the combustion chamber spaces, and function as acoustic resistors coupled to the wave guides to give a further attenuative response to, or effect on, the sound waves in the wave guide. Their attenuative response to the particular wavelengths established by the dimensions of the wavelength is controlled by the dimensions of the structures involved, including the dimensions of the clearance space, and the extension of the plug into the wave guide. The orifice effect here mentioned functions as an acoustic resistor shunt coupled to the wave guide, and it is made responsive to the wavelengths prevalent in or determined by the wave guide simply by adjusting the orifice resistance (by adjustment of dimensions, as aforesaid) until the desired attenuative response is had.

This attenuative response offered by plug clearance is especially effective as a series coupled acoustic resistor for any wave modes resulting from low frequency oscillations between the wave guide and the combustion chamber space outside the guide. The attenuative orifice is ideally coupled to the guide for control of the higher frequency modes within the guide itself. The dimensions of the orifice can be controlled for principal attenuative response to either the low or the high frequency modes spoken of, as will be evident.

A further modified form of the invention results from the use of a plurality of plugs such as spoken of in the immediately preceding paragraphs (such as the plugs 155 and 175 of Figs. 20 and 23), projecting from the ceiling of a combustion chamber partially into a corresponding plurality of wave confining cavities in the piston, such as the cavities in the top of the piston of Fig. 26, suitably dimensioned acoustic orifices again being provided between the plugs and cavities as discussed above. Such an acoustic attenuator has the advantage in practice that it is self-cleaning. Furthermore, it has a broad frequency response because it is of changing dimensions as the piston moves. This type of acoustically designed combustion chamber also scavenges well because the gas-traps and acoustic resistors exist only momentarily on each cycle of the engine.

The various illustrations of the invention given herein are of course to be understood as illustrative of and not restrictive on the scope of the invention, it being evident that various additional modifications may be made within the spirit and scope of the invention without departing from the scope of the appended claims.

What is claimed is:

1. An internal combustion engine comprising a cylinder barrel having a cylinder, said barrel including a combustion chamber head wall over said cylinder, a piston in said cylinder having a head wall, at least one of said chamber and piston head walls configured to form a wave guide cavity therebetween, said cavity serving as combustion chamber space at top dead center and constraining acoustic gas oscillations in said space to modes which are reflected at the terminations of said cavity, and acoustic wave suppressor means acoustically coupled to said cavity and having an attenuative acoustic response for the frequencies of said cavity for inhibiting acoustic wave pattern modes therein.

2. The subject matter of claim 1, wherein said wave guide cavity comprises a groove formed in and extending across the head wall of the piston, and wherein said acoustic wave suppressor means comprises an absorber mounted in the cylinder barrel in communication with an end of said groove when the piston is at top dead center.

3. The subject matter of claim 1, wherein said wave guide cavity comprises a groove formed in and extending across the head wall of the piston, and wherein said acoustic wave suppressor means comprises a wedge shaped porous absorber mounted in said piston groove and extending longitudinally therealong.

4. The subject matter of claim 1, wherein said wave guide cavity is comprised in part of a groove extending across the head wall of the piston, and including also means fixed in said barrel providing a wave guide extension channel communicating with an end of said piston groove when said piston is at top dead center, and wherein the acoustic wave suppressor means comprises an absorber positioned at the end of said extension channel remote from its point of communication with the piston groove.

5. The subject matter of claim 4, wherein the piston groove and extension channel constitute the major part of the combustion chamber space at top dead center.

6. The subject matter of claim 1, wherein said wave guide cavity is comprised in part of a groove extending across the head wall of the piston, and including also means fixed in said barrel providing wave guide extension channels communicating with opposite ends of said piston groove when said piston is at top dead center, and wherein the acoustic wave suppressor means comprise absorbers positioned at the ends of said extension channels which are remote from the respective points of communication with the piston groove.

7. The subject matter of claim 6, wherein the piston groove and extension channels constitute the major part of the combustion chamber space at top dead center.

8. An internal combustion engine comprising a cylinder barrel having a cylinder, said barrel including a combustion chamber head wall over said cylinder, a piston in said cylinder having a head wall, at least one of said chamber and piston head walls configured to form an acoustic wave containing cavity therebetween, all but one of whose wave path dimensions are materially less than the diameter of the cylinder, the piston and chamber head walls being so constructed and arranged that said cavity forms at least the preponderant portion of the combustion chamber space between the piston and the chamber head wall at top dead center, and acoustic wave suppressor means acoustically coupled to said acoustic cavity in a region thereof to attenuate acoustic waves in said cavity along said one wave path dimension, said suppressor means having an attenuative acoustic response for the frequency of said waves.

9. An internal combustion engine comprising a cylinder barrel having a cylinder, said barrel including a combustion chamber head wall over said cylinder, a piston in said cylinder having a head wall, at least one of said chamber and piston head walls configured to form a linear wave guide channel therebetween, said channel serving as combustion chamber space at top dead center and constraining acoustic gas oscillations in said space to modes which are longitudinal of said channel, and acoustic wave suppressor means coupled to said linear wave guide channel and having an attenuative response for the frequencies of said channel for inhibiting acoustic wave pattern modes therein.

10. The subject matter of claim 9, wherein said wave guide channel constitutes the major part of the combustion chamber clearance volume at top dead center.

11. The subject matter of claim 9, wherein the other of said chamber and piston head walls includes a transverse rib projecting toward and adapted to enter partially into said wave guide channel to close the otherwise open side of said channel for a predetermined range of piston travel beyond top dead center.

12. The subject matter of claim 9, including also a wall projecting from the other of said chamber and piston head walls and partially entering said wave guide channel to close the otherwise open side of said channel for a predetermined range of piston travel beyond top dead center.

13. The subject matter of claim 9, wherein said wave guide channel comprises a groove formed in and extending across the head wall of the piston.

14. The subject matter of claim 13, including also a wall projecting downwardly from said chamber head wall and partially entering said groove to close the otherwise open side of said groove for a predetermined range of piston travel beyond top dead center.

15. The subject matter of claim 13, wherein said acoustic suppressor means comprises an absorber carried by said piston and exposed to at least one end of said groove.

16. An internal combustion engine comprising a cylinder barrel having a cylinder, said barrel including walls forming a combustion chamber head wall over said cylinder, a piston in said cylinder having a head wall, at least one of said chamber and head walls configured to form a linear wave guide channel between said walls, said channel constituting a sufficient proportion of the combustion chamber space at top dead center to substantially constrain acoustic gas oscillations in said space to modes which are longitudinal of said channel, and acoustic wave suppressor means coupled to said linear wave guide channel and having an attenuative acoustic response for the frequencies of said linear wave guide channel for inhibiting longitudinal acoustic wave pattern modes in said linear wave guide channel.

17. An internal combustion engine comprising a cylinder barrel having a cylinder, said barrel including a combustion chamber head wall over said cylinder, a piston in said cylinder having a head wall, said piston head wall having a substantially diametric groove sunk therein to form a linear guide channel, said channel serving as combustion chamber space at top dead center and tending to constrain acoustic gas oscillations in said space to modes which are longitudinal of said channel, and acoustic wave suppressor means coupled to said linear wave guide channel and having an attenuative acoustic response for the frequencies of said channel for inhibiting longitudinal acoustic wave pattern modes therein.

18. An internal combustion engine comprising a cylinder barrel having a cylinder, said barrel including a combustion chamber head wall over said cylinder, a piston in said cylinder having a head wall, at least one of said chamber and piston head walls configured to form a wave guide cavity therebetween, said cavity serving as combustion chamber space at top dead center and constraining acoustic gas oscillations in said space to predetermined modes of wave frequency characteristic thereof, and acoustic wave suppressor means acoustically coupled to said cavity and having an attenuative acoustic response for said predetermined wave frequency for inhibiting an acoustic wave pattern mode therein.

19. An internal combustion engine comprising a cylinder barrel having a cylinder, said barrel including a combustion chamber head wall over said cylinder, a piston in said cylinder having a head wall, at least one of said chamber and piston head walls configured to form wave guide cavity space therebetween, said cavity space serving as combustion chamber space at top dead center and constraining acoustic gas oscillations in said space to predetermined modes of wave frequency characteristic thereof, and acoustic wave suppressor means acoustically coupled to said cavity and having an attenuative acoustic response for said wave frequency for inhibiting an acoustic wave pattern mode therein.

20. The subject matter of claim 19, wherein said wave guide cavity space has a maximum dimension materially less than the diameter of the cylinder.

21. The subject matter of claim 19, wherein the wave guide cavity space is divided into a plurality of pockets, all of maximum dimension materially less than the diameter of the cylinder.

22. The subject matter of claim 19, wherein the wave guide cavity space is comprised of a plurality of pockets sunk into the head wall of the piston, all of maximum dimension materially less than the diameter of the cylinder.

23. The subject matter of claim 19, wherein the wave guide cavity space is comprised of a plurality of pockets sunk into the head wall of the piston, all of maximum dimension materially less than the diameter of the cylinder, and wherein said acoustic wave suppressor means comprises a porous plate mounted on the head wall of the piston and apertured over said pockets.

24. The subject matter of claim 19, wherein said piston head wall has a reduced upper end portion to provide said wave guide cavity space in the form of circumferentially extending wave guide space located between said reduced piston portion and the wall of the cylinder.

25. The subject matter of claim 24, wherein said acoustic suppressor means comprise porous absorbers mounted on said piston in said circumferential wave guide space at unequal spacing intervals therealong.

26. The subject matter of claim 19, including also a closure means projecting from the other of said chamber and piston walls and partially entering said wave guide cavity space to close the otherwise open side thereof for a predetermined range of piston travel beyond top dead center.

27. The subject matter of claim 26, wherein said wave guide cavity space is in the piston, and said closure means depends from the chamber wall.

References Cited in the file of this patent

UNITED STATES PATENTS

| | | |
|---|---|---|
| 1,814,781 | Bailey | July 14, 1931 |
| 2,061,826 | Bremser | Nov. 24, 1936 |
| 2,504,036 | Morrison | Apr. 11, 1950 |